May 31, 1927.
H. A. MORRIS
RATCHET OPERATING DEVICE
Filed Aug. 13, 1925
1,630,403
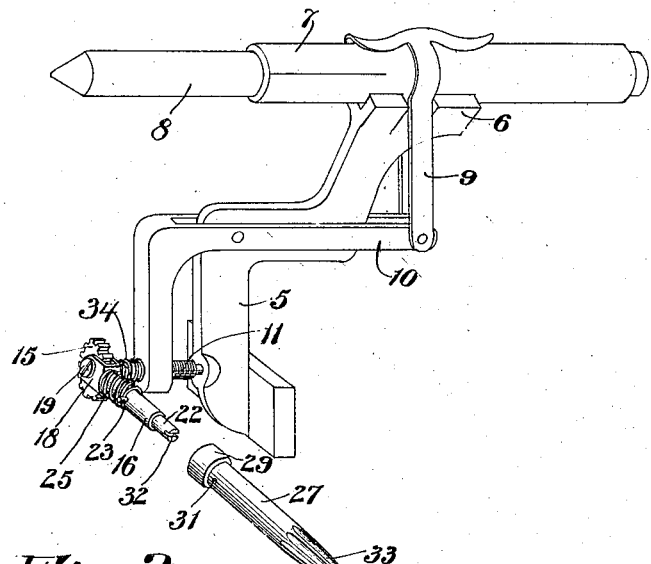
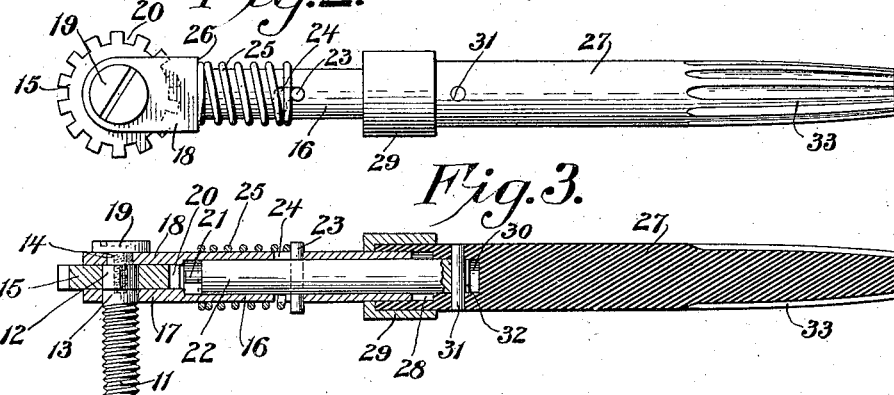
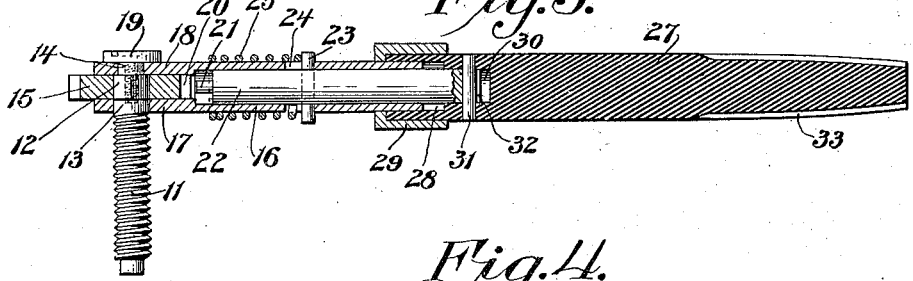
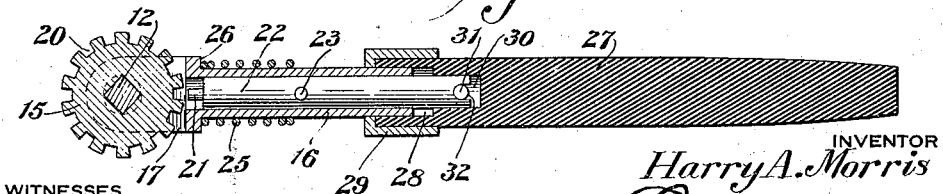
WITNESSES
Chas. L. McDonald
E. N. Lovewell
INVENTOR
Harry A. Morris
BY E. G. Siggers
ATTORNEY Patented May 31, 1927.

1,630,403

UNITED STATES PATENT OFFICE.

HARRY ALTON MORRIS, OF MARIETTA, OHIO.

RATCHET-OPERATING DEVICE.

Application filed August 13, 1925. Serial No. 50,047.

This invention relates to a ratchet operating device particularly adapted for use in turning screws and the like.

The object of the invention is to provide a simple, inexpensive and practical device of this nature which may be used with especial advantage for effecting adjustments, which are difficult of access, or which, by reason of high temperature, or other conditions, can not ordinarily be handled directly. Such conditions prevail, for example, in connection with the screw used in arc projector lamps for clamping the carbon in the holder.

The detailed construction of the invention and the advantages thereof will be more specifically described with reference to the accompanying drawing, in which Figure 1 is a perspective view of a carbon holder with the invention operatively connected therewith.

Figure 2 is a side elevation of the invention.

Figure 3 is a central longitudinal section thereof.

Figure 4 is a central longitudinal section taken at right angles to the plane of Figure 3.

The invention is shown in connection with a construction which comprises a bracket 5, formed with a seat 6 for receiving a split sleeve 7 constituting a holder for the carbon 8. The holder 7 is adapted to be clamped to its seat by a yoke 9, which is pivotally connected to one end of a bifurcated bell crank 10 intermediately fulcrumed on the bracket 5 and straddling the same. A screw 11 is connected with the other end of the bell crank 10, and is rotatable in one direction to draw the yoke 9 into clamping relation to the holder, and rotatable in the other direction to release the same.

In lamps of this kind, the adjusting screw is difficult of access, and the fingers of the operator often become burned when manipulating the same. In carrying out the present invention, the outer end of the screw 11 is formed with a squared portion 12 on the inside of which is a bearing surface 13 of comparatively large diameter, and on the outer side of which is a bearing surface 14 of comparatively small diameter. A ratchet wheel 15 is mounted on the squared portion 12 of the screw, being provided with a squared opening for receiving the same. A tubular lever 16 is formed at one end with spaced arms 17 and 18 adapted to straddle the ratchet wheel 15, and to be journaled on the bearing surfaces 13 and 14, respectively. A screw 19, with a flat head, is threaded into the outer end of the screw 11 to retain the ratchet wheel and lever thereon.

The ratchet wheel 15 is provided with notches 20 adapted to be selectively engaged by a pin 21 projecting from the inner end of a bolt 22, which is slidably mounted in the tubular lever 16, and limited in its movement by a cross head 23 guided in bayonet slots 24 formed in the lever. The pin 21 is normally held out of engagement with the notches 20 by an expansile coiled spring 25, which surrounds the tubular lever 16 between the cross head 23 and the shoulder 26 formed at the rear ends of the arms 18 and 17.

The bolt 22 and the lever 16 may be manipulated by means of an extension or handle 27, preferably made from wood fiber, or similar material, and having at its inner end a cylindrical socket 28 adapted to receive the end of the lever, and preferably reinforced by a ferrule 29. The socket 28 is formed with a reduced extension 30 adapted to receive the end of the bolt 22. This socket portion 30 is traversed by a pin 31, which is engageable in a channel 32 formed in the end of the bolt 22, so that the bolt may be rotated within the tubular lever, if desired. The outer portion of the lever 27 is preferably fluted, as shown at 33, so that it may be more easily manipulated in case the operator's fingers are moist or oily. A coil spring 34 may be placed on the screw 11 between the arm 17 and the adjacent end of the bell crank 10 to hold the screw in the position to which it is adjusted.

In the operation of the invention, after the handle has been placed upon the end of the lever 16, a slight inward pressure thereon will overcome the tension of the spring 25 and cause the finger 21 to engage one of the notches 20, whereupon the screw 11 may be rotated in the direction desired. By releasing the pressure upon the end of the handle, the finger 21 is withdrawn, and the lever may be rotated backwardly to engage another notch in the ratchet wheel. By pushing the bolt 22 inwardly, and at the same time rotating the handle 27 to the left, the cross head 23 may be engaged with the inner ends of the bayonet slots 24, so that the lever will be locked to the ratchet wheel.

The use of this ratchet device in the manner described saves a great deal of time in adjusting or replacing the carbon, and enables the operator to effect the adjustment without burning his fingers. While I have shown and described the invention as used in connection with a carbon holder for arc lamps, it is obvious that the same may be used to advantage in a bench vise, or in connection with any screw threaded element which is difficult of access, and which it is convenient to operate by means of a lever moving back and forth through a small arc. It is also to be understood that the precise construction is not limited to the precise construction and arrangement of elements herein shown and described, but includes various modifications which fall within the scope of the appended claims.

What is claimed is:

1. The combination with a rotatable shank and a wheel mounted thereon and provided with peripheral notches, of a lever journaled on said shank, a bolt slidably supported by the lever and engageable with the notches in the wheel when moved inwardly, a spring normally holding the bolt in its outermost position, an extension handle having a socket slidable longitudinally on the outer end of the lever, and means within the socket engageable with the outer end of the bolt when the handle is moved inwardly and operable when so moved to move the bolt in opposition to the spring and into engagement with one of the notches, whereby the wheel and shank may be rotated by swinging the handle.

2. The combination with a rotatable shank having a portion which is non-circular in cross section, and a wheel mounted on said non-circular portion and provided with peripheral notches, of a tubular lever having a bifurcated end straddling the wheel and journaled on said shank, a bolt slidable in said lever and projecting outwardly beyond the end thereof, a spring normally holding the bolt in retracted position and out of engagement with the wheel, an extension handle having a socket slidable on the outer end of the lever, said handle being operable by endwise inward movement to engage the bottom of the socket with the outer end of the bolt and move the latter inwardly into engagement with one of the notches, whereby the shank may be rotated by swinging the handle.

3. The combination with a rotatable screw having a shank portion which is non-circular in cross section, and a wheel mounted on said non-circular portion and provided with peripheral notches, of a tubular lever having a bayonet slot therein and having a bifurcated end straddling the wheel and journaled on said shank, a bolt slidable in said lever and projecting outwardly behind the end of the lever, a pin on said bolt engaging said bayonet slot and cooperating therewith to lock the bolt in engagement with a selected one of said notches, a spring normally holding the bolt in retracted position and out of engagement with the notches when it is not so locked, said bolt having a transverse channel in its outer end, an extension handle having a socket slidable on the outer end of the lever, said socket having a reduced inner portion receiving the outer end of said bolt, and a pin traversing the reduced portion of the socket and engageable with the channel, whereby said handle is operable by endwise movement to engage the bottom of the socket with the end of the bolt and to move the latter inwardly into engagement with one of the notches, so that the shank may be rotated by swinging the handle, said handle being operable by a rotation thereof when pressed inwardly to move the pin in the bayonet slot and thereby lock the bolt in engagement with the selected notch.

In testimony, that I claim the foregoing as my own, I have hereto affixed my signature.

HARRY ALTON MORRIS.